United States Patent [19]
Frost et al.

[11] 3,751,861
[45] Aug. 14, 1973

[54] METHOD FOR FINISHING ANTI-FRICTION BEARINGS

[75] Inventors: Charles C. Frost, Kentwood; Thomas E. Shaw, Grandville; Siegfried K. Weiss, Grand Rapids, all of Mich.

[73] Assignee: Forst Engineered Products, Inc., Grand Rapids, Mich.

[22] Filed: June 30, 1971

[21] Appl. No.: 158,311

[52] U.S. Cl. .................................. 51/316, 51/289 S
[51] Int. Cl. ..... B24b 1/00, B24b 11/02, B24b 31/06
[58] Field of Search ...................... 51/313, 316, 317, 51/289 R, 289 S, 291, 163, 323

[56] References Cited
UNITED STATES PATENTS

| | | | |
|---|---|---|---|
| 2,548,264 | 4/1951 | Howe | 51/316 X |
| 3,466,815 | 9/1969 | Balz | 51/163 |
| 3,248,826 | 5/1966 | Van Fossen | 51/316 |
| 1,946,440 | 2/1934 | Herrmann | 51/313 X |
| 3,256,643 | 6/1966 | Sudarsky | 51/313 X |

Primary Examiner—Donald G. Kelly
Attorney—Price, Heneveld, Huizenga & Cooper

[57] ABSTRACT

A method for refurbishing used assembled anti-friction bearings in which the bearings are first given a preliminary washing with a solvent and the seals and shields on the bearing are removed. The bearing is then placed in a vibratory finishing mill having a quantity of finishing material therein which acts upon and finishes the bearing for a predetermined period of time. The finishing media is then washed from the bearing, the bearing is lubricated and new shields are replaced. The final finishing of new bearings may also be accomplished in accordance with the method disclosed herein.

10 Claims, 4 Drawing Figures

Patented Aug. 14, 1973

3,751,861

INVENTORS
CHARLES C. FROST
BY THOMAS E. SHAW
SIGFRIED K. WEISS

ATTORNEYS

METHOD FOR FINISHING ANTI-FRICTION BEARINGS

BACKGROUND OF THE INVENTION

This invention relates to the finishing of new bearings as well as to the refurbishing of used bearings particularly of the ball, rollers, or needle bearing-type commonly known as anti-friction bearings.

Bearings of this type which provide for a rolling contact between a pair of relatively movable members usually comprise a pair of hardened steel ring members or raceways between which one or more sets of hardened steel balls, rollers or needles are located. A cage or separator member may also be provided to keep the rolling elements at the proper distance from each other. In some cases, the separator is not provided and the rolling elements are positioned adjacent each other. Oil seals and/or dirt shields may also be provided to prevent the entrance of contaminating materials between raceways and to retain lubricating materials therein.

Bearings of this type must be manufactured to a high degree of accuracy. Critical machining of the raceways is required as well as critical machining and selection of the rolling elements to insure the greatest anti-friction capabilities. Obviously, such bearings are relatively expensive and when they become worn or contaminated, it is desirable, if possible to refurbish the bearing to extend its useful service life. Obviously, the cost of refurbishing a bearing is considerably less than that of the production of a new bearing. However, rebuilding of such bearings has, in the past, been a time consuming, laborious task requiring specialized machinery, in fact, much the same machinery is required in rebuilding a bearing as is required in the production of a new bearing.

A typical ball bearing is generally rebuilt in the following manner. (1) The bearings are first preliminarily washed in a solvent to remove accumulated external dirt, grease and the like. (2) The oil seals and shields are removed. (3) The retainer element is opened so that the rolling elements can be removed and discarded and the raceways are separated. (4) The inner and outer races are ground and honed to proper size. (5) After refinishing, the inner and outer races are gaged and matched according to their size. (6) The bearing is assembled using new rolling elements and retainers and lubricated. (7) New seals and shields are replaced and (8) The bearing is tested.

Many of the aforementioned steps require specialized machines and equipment. In addition, as the bearing is disassembled, the rolling element retainer is destroyed and the rolling elements are discarded therefore requiring replacement of rolling elements and retainers. The grinding and honing operations are time consuming. The assembly of the bearing itself is a very specialized task requiring specialized machinery.

In the past, it has always been considered necessary by those skilled in the art to completely disassemble the bearing as above described in order to refinish it. Various attempts have been made to clean bearings using pressurized abrasive devices, i.e., sand blasting, abrasive solvents and the like. These procedures, however, have not met with success as microsopic surface imperfections or "false brinelling" often occurs in the raceways resulting in a useless bearing.

While the above-described techniques for refinishing or rebuilding bearings is time consuming and relatively costly, it is effective in that bearings rebuilt in such a manner have a service life equal to that of an original bearing.

SUMMARY OF THE INVENTION

We have discovered a new method wherein bearings may be refurbished without complete disassembly thereof, without separate grinding and honing operations on the raceways, without replacement of the rolling elements, without size gaging or matching of parts for reassembly and without destruction of any of the bearing retaining elements thereby eliminating the necessity for replacing those parts. Consequently, with our discovery, time, labor and equipment costs are considerably reduced.

Basically, the method of the present invention involves the use of a vibratory finishing mill having a quantity of ceramic finishing media therein to act upon a bearing placed in the media. The shields and seals are first removed from the ends of the bearing prior to its placement in the finishing media to allow the media to probe into and around the inner portions of the bearings, rolling elements, the raceways and the rolling element retainer.

It is a primary object of this invention therefore to provide a method for refurbishing anti-friction bearings.

It is another object of the invention to provide a method for refurbishing a bearing without disassembly thereof.

It is another object of this invention to provide a method for refurbishing bearings that is comparatively low in cost. It is another object of this invention to provide an anti-friction bearing refurbishing method which requires a minimum of time, labor and equipment. Still, another object of this invention to provide a method of final finishing new anti-friction bearings. Other objects, and aspects and the many advantages of this invention will become apparent to those skilled in the art from a study of this disclosure, the drawings and the appended claims.

BRIEF DESCRIPTION OF THE DRAWINGS

The invention will now be described with reference to the accompanying drawings in which.

DESCRIPTION OF THE PREFERRED EMBODIMENT

Figure 1:
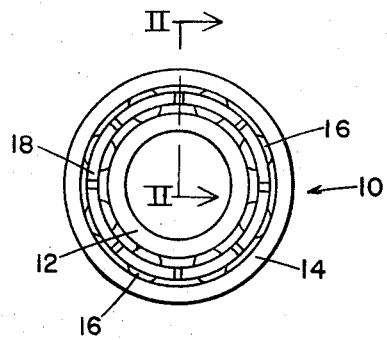
FIG. 1 is a top plan view illustrating a bearing which may be processed in accordance with the teachings of this invention.
Figure 2:
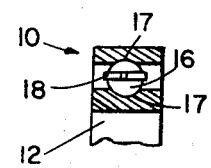
FIG. 2 is a cross-sectional view of the bearing of FIG. 1 taken along the plane 2—2.

A typical anti-friction bearing 10 of the type which may be refurbished in accordance with this invention is illustrated in FIGS. 1 and 2. The bearing 10 is of conventional construction having an inner race 12, an outer race 14 and a plurality of rolling elements or hardened steel balls 16 centrally located between the inner and outer races. As is well known to those skilled in the art, the rolling elements 16 are positioned in grooves or raceways 17 located about the outer diameter of the inner race and the inner diameter of the outer race. A separator or cage element 18 serves to keep the rolling elements at the proper distance from each other.

Figure 3:
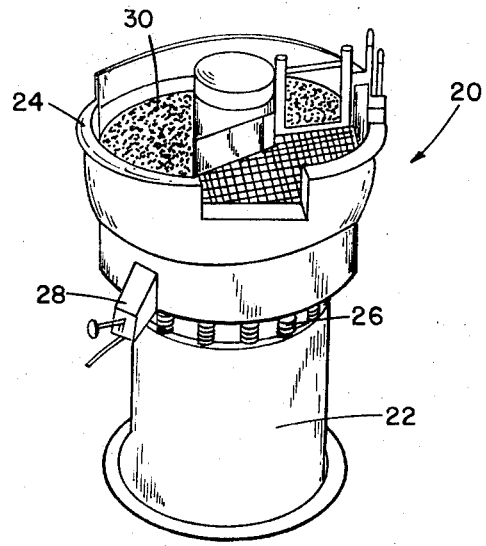
FIG. 3 is a perspective view of a vibratory finishing mill which may be utilized in the practice of this invention.

A vibratory finishing mill 20 which may be utilized in the practice of this invention is illustrated in FIG. 3 and is of conventional construction. Basically, the finishing mill comprises a lower base or mounting member 22 and an upper toroidal shaped bowl or hopper 24. The hopper is supported above the base on a plurality of support springs 26. An electric motor (not shown) located within the base is connected by its drive shaft to the bowl. Eccentric weights (not shown) are connected to the drive shaft to impart a vibratory motion to the bowl when the motor is operated. When operated, the motor weights and support springs give the bowl a high frequency tilting and rolling movement with both horizontal and vertical amplitudes.

Figure 4:
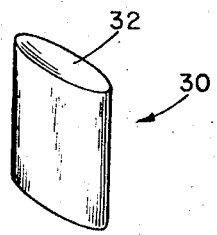
FIG. 4 is a perspective view of an individual fragment of the finishing media which operates upon the bearing in the practice of this invention.

The bowl 24 is essentially toroidal shaped and has a quantity of finishing media contained therein. An individual fragment of such media 30 is illustrated in FIG. 4. The preferred media utilized in the practice of this invention is made of a ceramic material and is of the type commonly known as an "angle cylinder." As the name implies, the ceramic material is cylindrical in shape and has each of its ends 32 cut at an angle. The diameter and length of the angle cylinders may vary depending upon the size of the bearings being refurbished. Obviously, other ceramic media such as stars, cones or triangles may be used as is well known to those skilled in the art of vibratory finishing.

As a practical example of the practice of this invention the material and equipment utilized for refurbishing a conventional standard '203 bearing will be described in detail. To refurbish a quantity of bearings of the type specified above, we have utilized a vibratory finishing mill having a bowl capacity of approximately 3 cubic feet which will accommodate up to 800 pounds of parts and media. One type of finishing mill suitable for use in the practice of this invention is available from SWECO INC., 6111 East Bandini Boulevard, Los Angeles, Calif., 90054, and is referred to as a Vibro-Energy Finishing Mill and is furnished under SWECO INC. model number FMD 3 HA.

A ceramic finishing material made for use in the above described vibratory mill is also available from SWECO INC. An angle cylinder type of media 30 illustrated in FIG. 4 is preferred. This media has a diameter of five-eighths of an inch and a length of 1-⅛ inches, the angle being cut at approximately 30°. This is available from SWECO INC. under their part designation F 5-8 which is a media suitable for mild deburring and fine finishing operations.

Prior to the finishing operation in the mill the bearings 10 are washed in a solvent to remove external dirt, grease and the like and, if they exist, all shields and seals are removed. A quantity of the above described media and bearings are then placed in the hopper of the mill and the mill is started by means of a switch 28 located on the mill and operated in a conventional manner.

The parts and media travel a spiral orbital path in the circular toroidal bowl. The action of the motor weights and support springs give the bowl a high-frequently tilting and rolling movement, with high horizontal and vertical amplitudes. This motion of the bowl causes the media to provide both shearing and peening action against the bearings. As the bearings and media are subjected to vibration the differences in mass between the bearings and media cause relative movement therebetween. As the bearing moves through the media various surfaces of media and bearing are presented to each other. The angle cylinders roll, slide and penetrate into crevices and openings in the bearings. Extremely small bits and pieces of media break away from the angle cylinders and work even further into and through the most remote areas and hidden crevices of the bearing to effectively clean and final finish all surfaces of the bearing.

After the mill is operated a length of time sufficient to thoroughly clean the bearings, generally about 2 hours for a size '203 bearing, they are removed, washed with a solvent and lubricated. New shields and seals are then replaced and the bearings are tested in a conventional manner as for a new bearing. The bearings are then ready for reuse.

As compared to the above-described prior method, the steps for refurbishing a bearing when practicing this invention are as follows: (1) Preliminary wash and removal of external dirt; (2) Removal of shields and seals; (3) Subject the bearing for a time in the vibratory mill; (4) Wash; (5) Lubricate and replace new seals and shields; and (6) Test.

Utilizing our invention, the steps of disassembly, grinding and honing of the bearing races, sizing of the parts and assembly with new rolling elements and retainers have been eliminated. Obviously there is a great savings alone in the cost of new rolling elements and retainers.

We have also found that new anti-friction bearings may also be produced in accordance with the teachings of this invention. In the case of new bearings, they are manufactured in a conventional manner except that the final finishing operation, that is the final finishing or honing and grinding of the bearing surfaces may be eliminated. The bearing is assembled in a somewhat unfinished state and is then placed with the media in the vibratory mill and operated on as previously described. The finishing media provides the final finish to the bearing which is normally performed in a plurality of separate operations.

It may therefore readily be seen that the invention described provides a method for refurbishing old bearings as well as a method for finishing new bearings. There is a great reduction in time, labor and equipment resulting in the production of new bearings and the refurbishing of used bearings at reduced cost and with great efficiency.

Other modifications and variations will of course be suggested to those skilled in the art without departing from the scope of the invention which is defined by the following claims.

We claim:

1. A method of finishing an anti-friction bearing having an inner race, an outer race, and a plurality of rolling elements spaced between said races comprising the steps of:
    a. placing said bearing together with an abrasive finishing media in a vibratory finishing mill;
    b. operating said mill to subject said bearing and said media to a vibratory action for a period of time sufficient to finish said bearing;
    c. removing said bearing from said media; and d. cleaning said media from said bearing.

2. The method of finishing a bearing as described in claim 1 wherein said vibratory action is a relatively high frequency tilting and rolling action having relatively high amplitude horizontal and vertical components.

3. The method of finishing a bearing as described in claim 2 and further including the steps of lubricating the bearing and testing the bearing.

4. A method of finishing an anti-friction bearing having an inner race, an outer race, and a plurality of rolling elements spaced between said races comprising the steps of:
   a. assembling an infinished inner race and an unfinished outer race together with a plurality of rolling elements therebetween;
   b. placing said unfinished inner race, outer race and rolling elements together with an abrasive finishing media in a vibratory finishing mill; and
   c. operating said mill to subject said bearing in its assembled state to a vibratory action in the presence of said abrasive finishing media for a period of time sufficient to finish said bearing.

5. The method of finishing a bearing as described in claim 4 wherein said vibratory action is a relatively high frequency tilting and rolling action having relatively high amplitude horizontal and vertical components.

6. The method of finishing bearings as described in claim 4 and further including the steps of removing said bearing from said mill and said media; and cleaning said media from said bearing.

7. The method of finishing bearings as described in claim 6 and further comprising the steps of lubricating said bearing and testing said bearing.

8. A method of finishing bearings as described in claim 4 and further including the steps of:
   a. removing said finished bearing from said vibratory finishing mill;
   b. removing said abrasive finishing material from said bearing; and
   c. lubricating said bearing.

9. A method of refurbishing used anti-friction bearings comprising the steps of:
   a. washing said bearing in a solvent;
   b. placing said washed bearing in an abrasive finishing material in a vibratory finishing mill;
   c. operating said mill for a period of time sufficient to clean said bearing;
   d. removing said bearing from said mill;
   e. cleaning said media from said bearing; and
   f. lubricating said bearing.

10. The method of refurbishing an anti-friction bearing as described in claim 9 wherein said vibratory action is a relatively high frequency tilting and rolling action having relatively high amplitude horizontal and vertical components.

* * * * *

UNITED STATES PATENT OFFICE
CERTIFICATE OF CORRECTION

Patent No. 3,751,861            Dated August 14, 1973

Inventor(s) Charles C. Frost, et al.

It is certified that error appears in the above-identified patent and that said Letters Patent are hereby corrected as shown below:

[73] Assignee ---"Forst" should be ---Frost---

Signed and sealed this 18th day of December 1973.

(SEAL)
Attest:

EDWARD M. FLETCHER, JR.         RENE D. TEGTMEYER
Attesting Officer               Acting Commissioner of Patents